United States Patent
Jonsson

(10) Patent No.: US 12,229,380 B2
(45) Date of Patent: Feb. 18, 2025

(54) DETECTING MANUALLY APPLIED PRESSURE

(71) Applicant: Peratech IP Ltd., Catterick Garrison (GB)

(72) Inventor: Carl Olof Fredrik Jonsson, Gävle (SE)

(73) Assignee: Peratech IP Ltd, North Yorkshire (GB)

( * ) Notice: Subject to any disclaimer, the term of this patent is extended or adjusted under 35 U.S.C. 154(b) by 0 days.

(21) Appl. No.: 18/203,600

(22) Filed: May 30, 2023

(65) Prior Publication Data

US 2023/0305668 A1    Sep. 28, 2023

Related U.S. Application Data

(63) Continuation of application No. PCT/GB2021/000128, filed on Nov. 25, 2021.

(30) Foreign Application Priority Data

Nov. 27, 2020 (GB) .................................. 2018700

(51) Int. Cl.
G06F 3/045 (2006.01)
G06F 3/041 (2006.01)

(52) U.S. Cl.
CPC ............ G06F 3/045 (2013.01); G06F 3/0414 (2013.01)

(58) Field of Classification Search
CPC .................... G06F 3/045; G06F 3/0414; G06F 2203/04106; G06F 3/0447; G06F 3/047;
(Continued)

(56) References Cited

U.S. PATENT DOCUMENTS 6,504,530 B1 *  1/2003 Wilson ............... G06F 3/04186
                                                    345/173
9,151,792 B1 * 10/2015 Kremin ................. G06F 1/169
(Continued)

FOREIGN PATENT DOCUMENTS

EP    3351915 A1    7/2018
WO    2008009687 A2    1/2008
(Continued)

OTHER PUBLICATIONS

Corresponding International Patent Application No. PCT/GB2021/000128, International Search Report, date mailed Feb. 22, 2022.
(Continued)

*Primary Examiner* — Mihir K Rayan
(74) *Attorney, Agent, or Firm* — Cooper Legal Group LLC

(57) ABSTRACT

A detector is shown for detecting manually applied pressure. A substrate defines a position of activation and electrodes are mounted on this substrate. A processing device is energized such that the electrodes are configured to identify a position of applied pressure by detecting a change in resistance in response to a first energizing signal received from the processing device. Furthermore, the electrodes are configured to confirm this position of applied pressure by detecting a change in capacitance in response to a second energizing signal received from the processing device. The electrodes comprise a first electrode located on an upper surface which detects the change in capacitance, and second and third electrodes which detect the change in resistance.

13 Claims, 8 Drawing Sheets

(58) Field of Classification Search
CPC ..... G06F 3/03547; G01L 1/205; G01L 5/228; G01L 1/146; G01L 5/22; G01L 1/142; G01L 1/20

See application file for complete search history.

(56) References Cited

U.S. PATENT DOCUMENTS

| | | | |
|---|---|---|---|
| 10,635,255 B2* | 4/2020 | Kugler | G06F 3/04883 |
| 2011/0299015 A1* | 12/2011 | Liu | G06F 3/0412 349/96 |
| 2012/0218221 A1* | 8/2012 | Igeta | G06F 3/0416 345/174 |
| 2014/0218334 A1* | 8/2014 | Shibata | G06F 3/044 345/174 |
| 2014/0375582 A1* | 12/2014 | Park | G06F 1/3231 345/173 |
| 2015/0185946 A1* | 7/2015 | Fourie | G06F 3/045 156/60 |
| 2016/0282999 A1 | 9/2016 | Hwang et al. | |

FOREIGN PATENT DOCUMENTS

| | | |
|---|---|---|
| WO | 2009023334 A2 | 2/2009 |
| WO | 2017165894 A1 | 9/2017 |

OTHER PUBLICATIONS

Corresponding International Patent Application No. PCT/GB2021/000128, Written Opinion, date mailed Feb. 22, 2022.

\* cited by examiner

DETECTING MANUALLY APPLIED PRESSURE

CROSS REFERENCE TO RELATED APPLICATIONS

This application is a continuation of and claims priority to International Patent Application number PCT/GB2021/000128, filed on 25 Nov. 2021, which claims priority from United Kingdom Patent Application number GB 20 18 700.1, filed on 27 Nov. 2020. The whole contents of International Patent Application number PCT/GB2021/000128 and United Kingdom Patent Application number GB 20 18 700.1 are incorporated herein by reference.

BACKGROUND OF THE INVENTION

The present invention relates to a detector for detecting manually applied pressure. The present invention also relates to a method of detecting the position of manually applied pressure.

It is known to provide position detectors on devices that may be responsive to the application of a finger or the movement of a finger. On mobile cellular telephones for example, it is known to provide screens that are responsive to being touched by using capacitive sensing. However, it is not possible to deploy sensing of this type at other locations, such as at the edge of the mobile device because the device will tend to be supported at its edges. Thus, the mere holding of the device could be interpreted as an instruction to activate a button. Consequently, physical buttons tend to be provided and these can often be a first point of failure.

An alternative approach is to use force sensors that rely on changes to the resistance of a device for which resistance is reduced when pressure is applied. However, a problem with sensors of this type is that applied force tends to be spread out over a larger area, therefore it is difficult to identify a localized force. Thus, although the application of force may be detected, it is difficult to actually determine the position of the applied force and subsequently detect movement.

BRIEF SUMMARY OF THE INVENTION

According to a first aspect of the present invention, there is provided a detector for detecting a manually applied pressure as claimed in in claim 1.

According to a second aspect of the present invention, there is provided a method of detecting the position of manually applied pressure as claimed in claim 11.

Embodiments of the invention will be described, by way of example only, with reference to the accompanying drawings. The detailed embodiments show the best mode known to the inventor and provide support for the invention as claimed. However, they are only exemplary and should not be used to interpret or limit the scope of the claims. Their purpose is to provide a teaching to those skilled in the art. Components and processes distinguished by ordinal phrases such as "first" and "second" do not necessarily define an order or ranking of any sort.

DETAILED DESCRIPTION OF EMBODIMENTS OF THE INVENTION

FIG. 1

Figure 1:
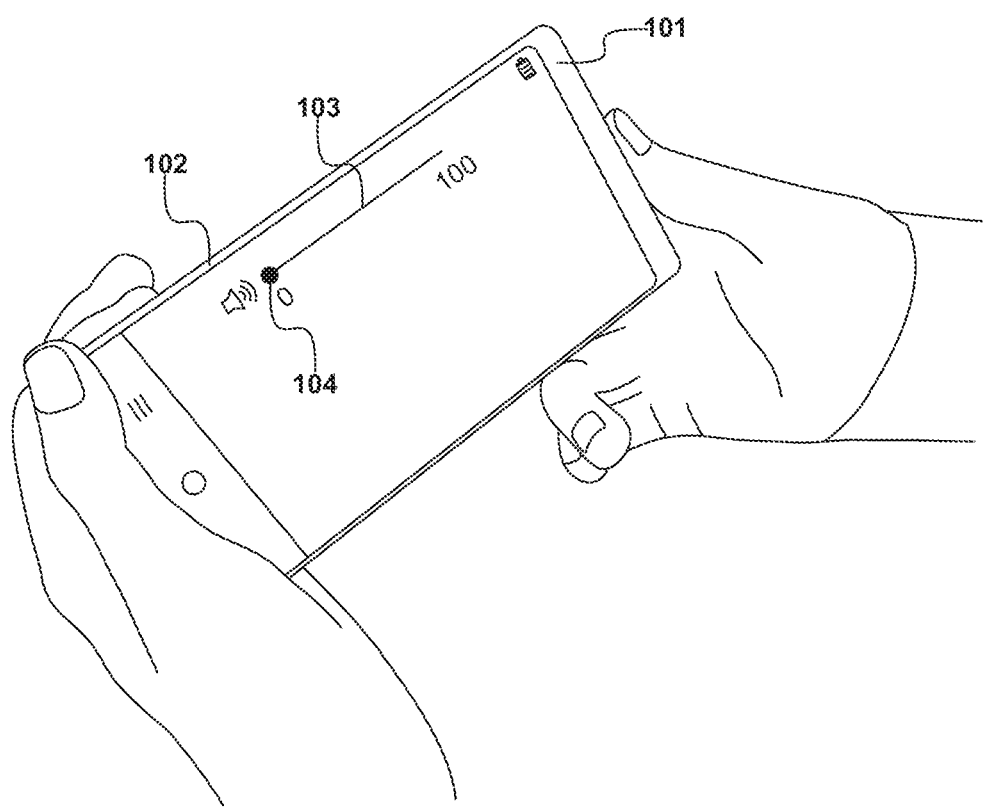
FIG. 1 shows a mobile cellular telephone.

A mobile cellular telephone 101 is shown in FIG. 1 and has a plurality of detectors positioned along an edge 102. The detectors 102 are touch sensitive and in response to moving a finger over these detectors, it is possible to control a parameter within an application running on the mobile telephone 101. However, it should be appreciated that, as an alternative to a mobile cellular telephone, other mobile devices could be deployed in this way, possibly having similar functionality to a mobile cellular telephone, such as a mobile touchpad, or taking the form of a function-specific device, possibly for controlling an industrial process.

In the example shown in FIG. 1, the mobile cellular telephone 101 produces an audio output and the volume of this audio output is controlled in response to manual movement over the detectors 102. In addition, a visual user interface representing a slider 103 is displayed to a user. Thus, in the example shown in FIG. 1, an indicator 104 positioned on the slider 103 confirms that the volume parameter is currently set to zero, such that no audio output is being produced. It should also be appreciated that other parameters can be adjusted in this way.

FIG. 2

Figure 2:
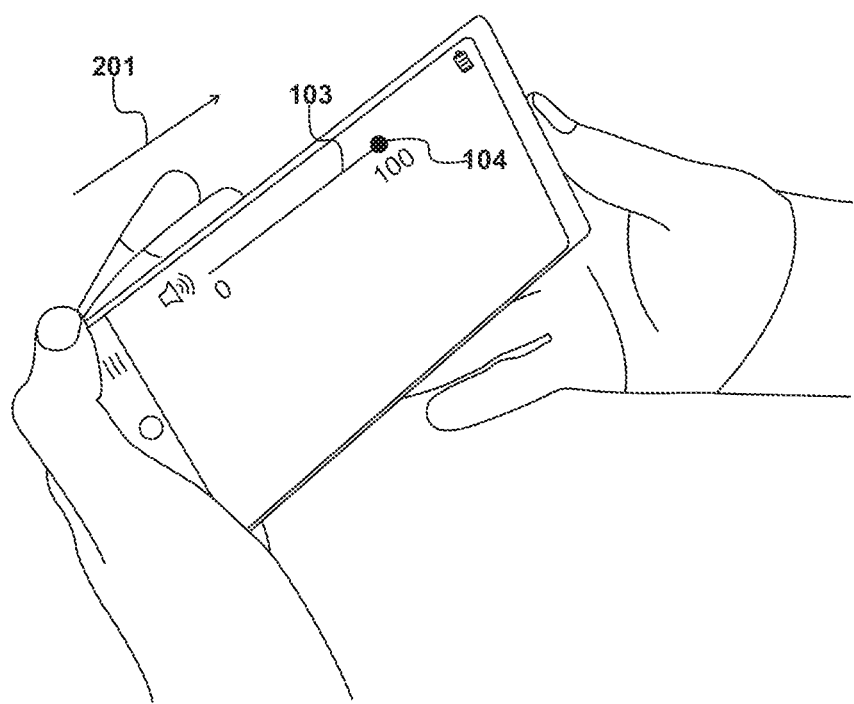
FIG. 2 shows the mobile cellular telephone of FIG. 1 in an alternative configuration.

As illustrated in FIG. 2, a user has applied pressure to the detector 102 and then moved a finger over the detector in the direction of arrow 201. As a result, the volume parameter has been increased to one-hundred percent, as shown by the indicator 104 positioned over the slider 103.

To achieve movement of the indicator 104, it is necessary to apply pressure to the detector region 102 and then maintain this pressure while movement occurs. The detector deploys capacitive techniques to identify the position of a moving finger to an appropriate level of accuracy for appropriate control of the volume parameter (or any other parameter requiring adjustment within a running application).

However, given that the detectors have been deployed on the edge 102 of the mobile device, it is appreciated that contact with the detector is likely to occur when holding the device for alternative operations. Thus, for example, when the device is a mobile telephone, the device may be held at this location while a user is engaged in a telephone conversation.

To avoid false triggering, the detectors also include an ability to detect applied force or pressure by using resistive techniques, with a material present having a resistance that reduces when pressure is applied. An embodiment may therefore consist of a resistive force sensor with elements that also may be deployed for the accurate detection of position using capacitive techniques.

It has been appreciated that the deployment of touch sensors as such produces a problem in that forces tend to be spread out over a relatively large area. Consequently, it is difficult to identify the position of localized forces, therefore the combining of a force sensor with a capacitive sensor allows accurate position data to be determined while reducing the possibility of false triggering occurring.

FIG. 3

Figure 3:
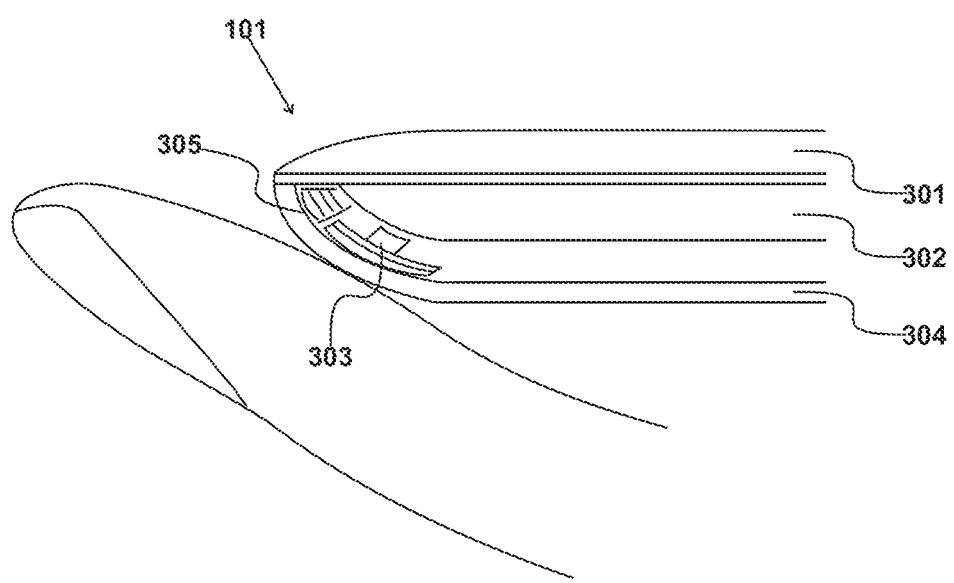
FIG. 3 shows a cross-section of the mobile device shown in FIG. 1.

A cross-section of the mobile device 101 is shown in FIG. 3. A display 301 is mounted upon a chassis 302 an array of detectors 303 is secured to a glass back cover 304 by a layer of waterproof tape 305.

Possible configurations for each detector within the detector array 303 will be described, identified as a first embodiment described with reference to FIG. 6, a second embodiment described with reference to FIG. 7 and a third embodiment described with reference to FIG. 8.

FIG. 4

Figure 4:
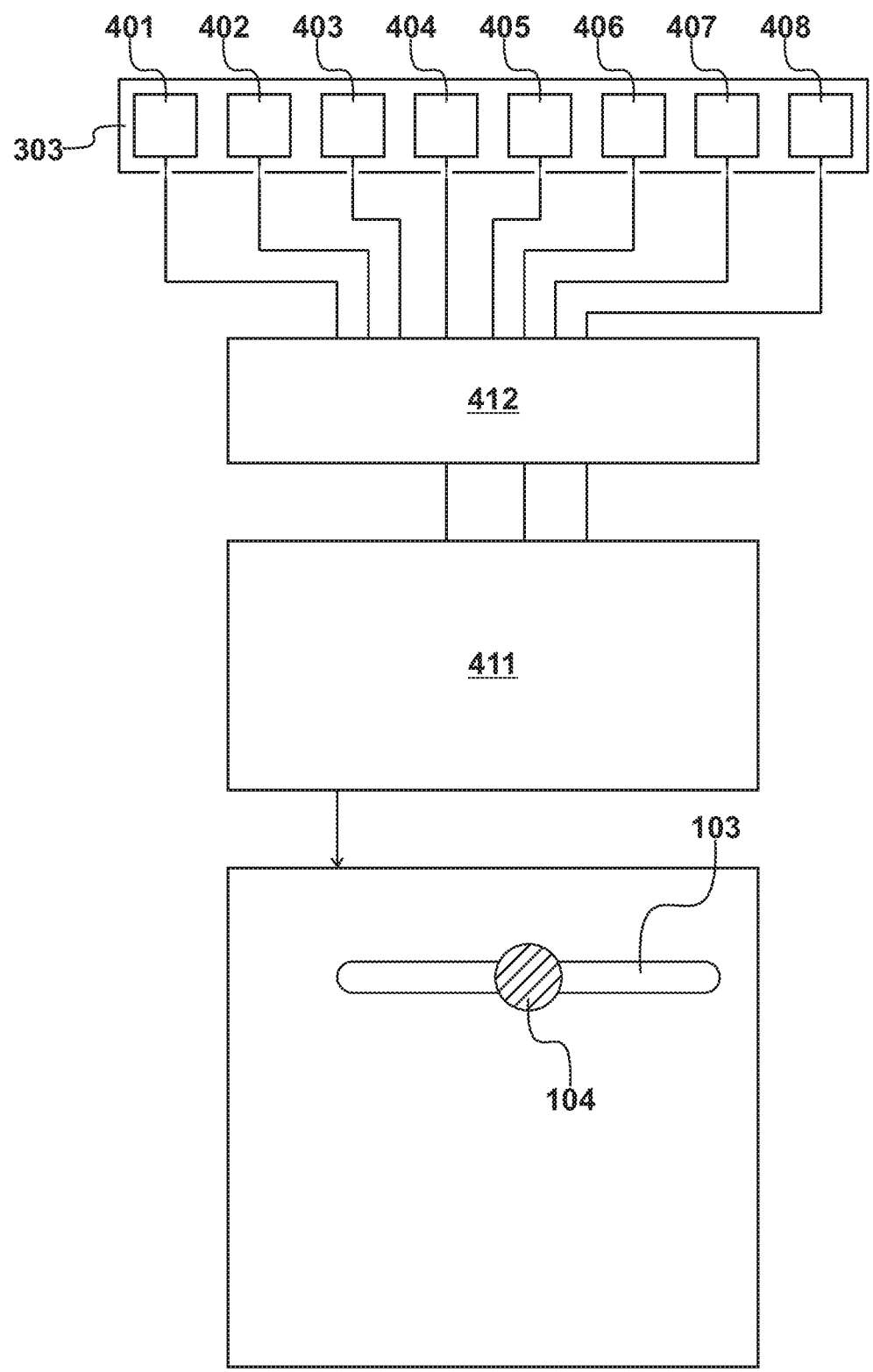
FIG. 4 shows a detector array.

Detector array 303 is illustrated in FIG. 4. In this example, the detector array 303 includes eight individual detector elements, although some deployments may include fewer and some deployments may include more. These are identified as detector elements 401 to 408.

In the embodiment of FIG. 4, the detector elements 401 to 408 communicate with a processing device 411 via a multiplexer 412. Positional data is determined by the processor 411, as described reference to FIG. 5 and output data is supplied to the application being executed by the mobile device, resulting in the generation of a graphical output display consisting of the indicator 104 and the slider 103.

FIG. 5

Figure 5:
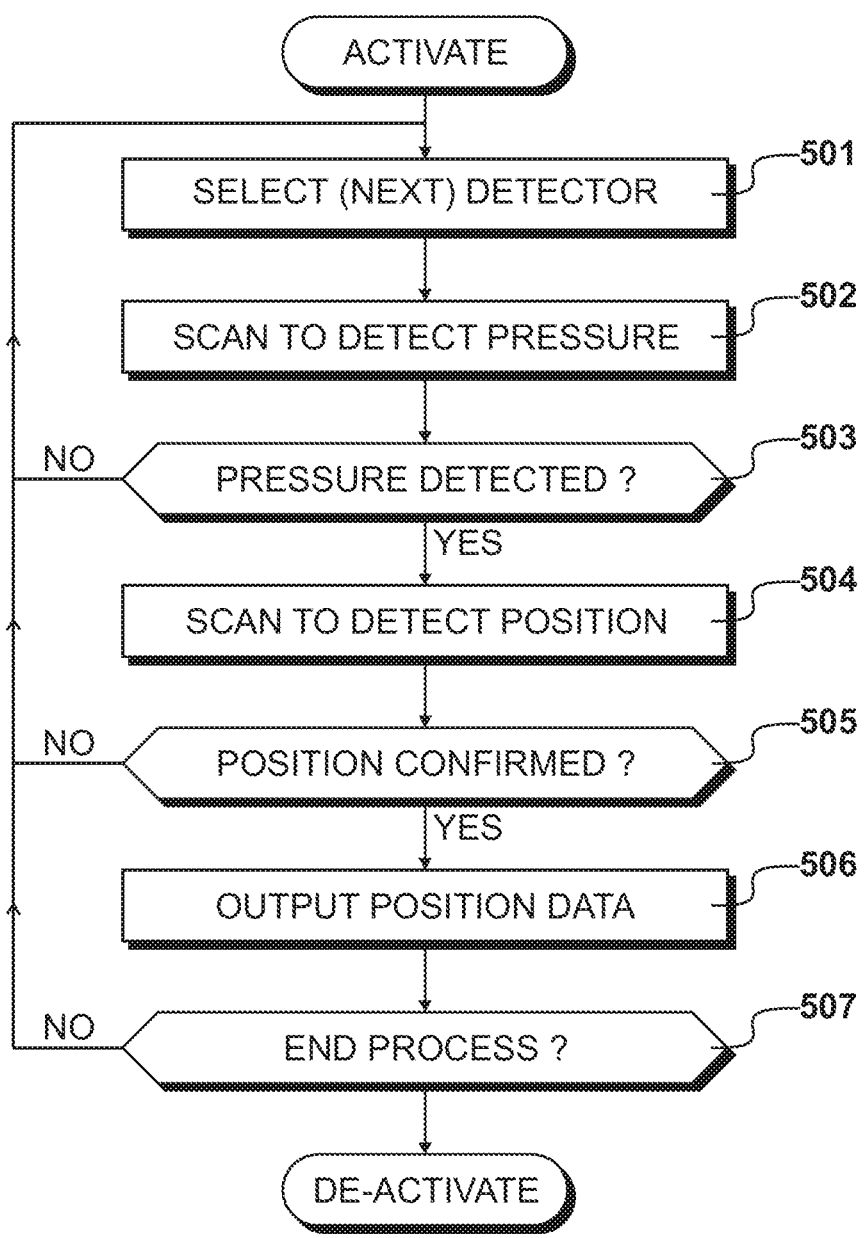
FIG. 5 shows operations performed by the processor identified in FIG. 4.

Operations performed by the processing device 411 are shown in FIG. 5. After activation, a detector is selected at step 501 which, on a first iteration, may be the first detector element 401.

At step 502, a scanning operation is performed to detect whether pressure has been applied to detector element 401. The detection of pressure by detector element 401 may be due to pressure being applied at the position of detector element 401. However, it is also appreciated the detector element 401 may also detect an application of pressure when the actual pressure is being deployed elsewhere, possibly at the position of detector element 403.

If pressure is not detected in response to the scan performed at step 502, and the question asked at step 503 is answered in the negative, control is returned to step 501 and the next detector is selected.

For the purpose of this example, it shall be assumed that pressure has been applied at the position of detector element 403 but this has been detected at detector element 401 and will be detected at detector element 402. Thus, the question asked at step 503 will be answered in the affirmative, to the effect that pressure has been detected.

At step 504 a further scan is performed, in an alternative configuration but again with respect to detector element 401 to detect position. The position detection operation deploys capacitive effects and, as such, results in a more accurate assessment of position.

In response to the scanning operation performed at step 504, a question is asked at step 505 as to whether the position has been confirmed. For the purposes of this example, it is assumed that position has not been confirmed and the question asked at step 505 is answered in the negative, thereby returning control to step 501.

On the second iteration, the next detector, detector element 402, is selected at step 501. Again, a scan is performed to detect pressure at step 502 and pressure is detected, resulting in the question asked at step 503 being answered in the affirmative. A further scan to detect position is then performed at step 504, which confirms that this is not the position where contact has been made such that, again, the question asked at step 505 is answered in the negative, thereby returning control to step 501.

On the third iteration, the third detector element 403 is selected at step 501. A scan is again performed at step 502 to detect pressure and the question asked at step 503 is again answered in the affirmative, resulting in a further scan to detect position being performed at step 504.

On this third iteration, the position is confirmed, resulting in the question asked at step 505 being answered in the affirmative. Thereafter, position data is produced as an output at step 506 which, in the embodiment described with reference to FIG. 4, will result in a movement of indicator 104.

At step 507 a question is asked as to whether the process is to end and when answered in the negative, control is returned to step 501, such that the next detector may be selected. Thus, the process will repeat with detector element 404 being selected. Again, due to the pressure applied at detector position 403, the question asked at step 503 is likely to be answered in the affirmative, resulting in a further scan to detect position being performed at step 504. However, on this fourth iteration, the question asked at step 505 will be answered in the negative and control will be returned to step 501.

The process therefore performs a pressure detection operation to determine that a physical press has been made on the edge of the device, as distinct from a lower force applied to hold the device. When pressure is detected, a further scanning operation is performed to confirm the actual position of the interaction. Consequently, output data is only produced when a specific detector detects pressure by means of resistive operations and this interaction is confirmed by means of capacitive operations.

FIG. 6

Figure 6:
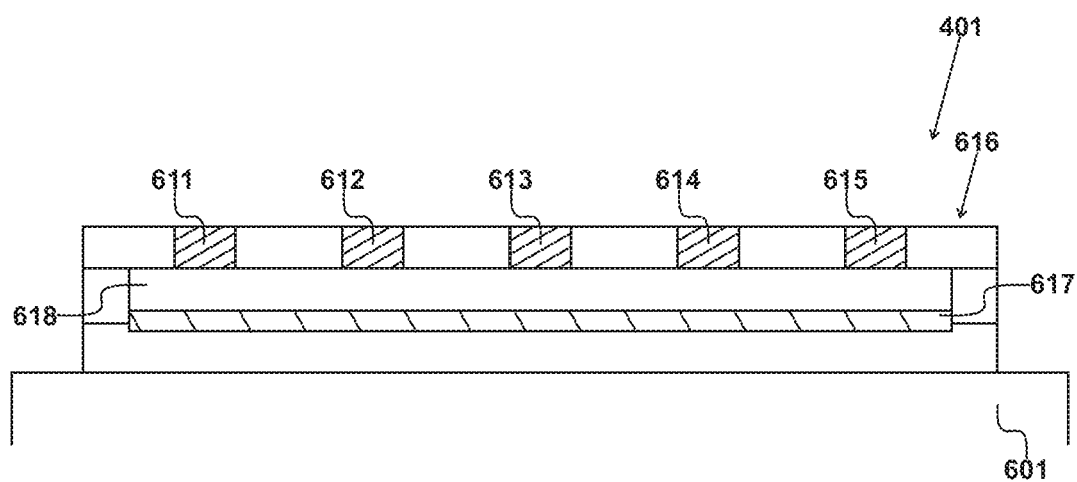
FIG. 6 shows a detector element of the type identified in FIG. 4.

Detector element 401 is illustrated in FIG. 6. A substrate 601 defines a position of activation. Each detector includes a plurality of electrodes mounted on this substrate, which communicate with the processing device 411 via the multiplexer 412. The electrodes are configured to identify a position of applied pressure by detecting a change in resistance, in response to a first energizing signal received from the processing device 411. The electrodes are also configured to confirm this position of applied pressure by detecting a change in capacitance in response to a second energizing signal received from the processing device.

So as not to influence capacitance measurements, in an embodiment, the electrodes are electrically isolated from the substrate 601. As described with reference to FIG. 3, the substrate may be located within a mobile communication device.

In the embodiment shown in FIG. 6 and in the second embodiment described with reference to FIG. 7, a common electrode is deployed when detecting a change in capacitance and when detecting a change in resistance.

In the embodiment of FIG. 6, a first arrangement of electrodes 611 to 615 are aligned in parallel along an upper surface 616. During the detection of a change in capacitance, the first arrangement of electrodes 611 to 615 are electrically connected to define a unified electrode. During the detection of a change in resistance, a first set of the first arrangement of electrodes are energized as source electrodes and a second set of the first arrangement of electrodes are monitored as detector electrodes. Thus, in an embodiment, when detecting a change in resistance, the source electrodes and the detector electrodes are selected so as to alternate in position.

In an embodiment, the first electrode 611 is a source electrode, the second electrode 612 is a detector electrode, the third electrode 613 is a source electrode, the fourth electrode 614 is a detector electrode and the fifth electrode 615 is a source electrode. Two connections are made to respective ports of the processing device 411, consisting of electrodes 611, 613 and 615 being connected in parallel for receiving and energizing signals from the processing device 411. Electrodes 612 and 614 are also connected in parallel to supply detection data to a second port of the processing device 411.

The detector of FIG. 6 includes a material for which resistance reduces in response to applied pressure. In an embodiment, this material may be constructed from the material identified commercially as QTC®. In the embodiment, an air gap is provided between the first arrangement of electrodes 611 to 615 and the material 617. When force is applied, the first arrangement of electrodes 611 to 615 is brought into contact with material 617, thereby applying resistance reducing force upon material 617.

When contact is made, it is possible for current to flow between electrodes. Thus, the application of pressure, resulting in the collapse of air gap 618, may result in a current flow from source electrode 611 to detector electrode 612. Furthermore, as this level of force increases, material 617 will become less resistive (more conductive) such that the amount of current flow will increase and this is detected by the processing device 411, resulting in the question asked at step 503 being answered in the affirmative.

FIG. 7

Figure 7:
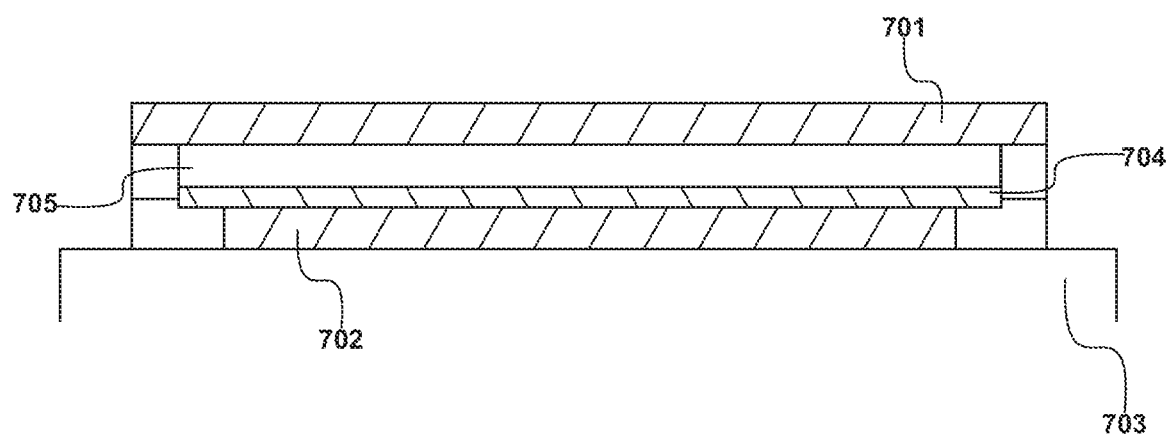
FIG. 7 shows a detector element of a second embodiment.

A second embodiment of a detector element is illustrated in FIG. 7. Like the embodiment described with reference to FIG. 6, a common electrode is deployed when detecting a change in capacitance and when detecting a change in resistance.

A first electrode 701 is positioned along an upper surface. A second electrode 702 is positioned along a lower surface, isolated from a substrate 703. The first electrode 701 is deployed for detecting a change in capacitance, in a manner that is similar to the combining of electrodes 611 to 615, as described with reference to FIG. 6.

The first electrode 701 is deployed with the second electrode 702 for detecting changes in resistance. A layer of material 704 is provided for which resistance reduces in response to applied pressure. This material is substantially similar to material 617 described with reference to FIG. 6. An air gap 705 is also present between the first electrode 701 and the material 704. When detecting pressure, the air gap 705 collapses, thereby bringing the first electrode 701 into contact with material 704. This provides a current path to the second electrode 702. The resistance of material 704 will reduce as pressure is applied, resulting in a higher current flow that is detected by the processing device 411.

FIG. 8

Figure 8:
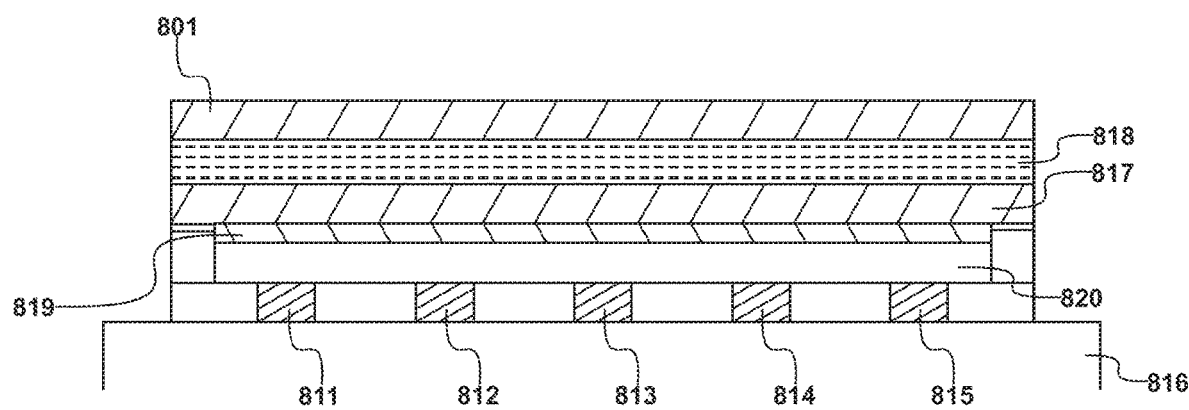
FIG. 8 shows a detector element of a third embodiment.

A third embodiment as shown in FIG. 8, in which the detector has a first electrode 801 located on an upper surface. This first electrode 801 is used exclusively for detecting changes in capacitance.

A set of parallel electrodes consisting of a first parallel electrode 811, a second parallel electrode 812, a third parallel electrode 813, a fourth parallel electrode 814 and a fifth parallel electrode 815 are present on a lower surface of the detector, isolated from a substrate 816. The first parallel electrode 811 may be identified as a second electrode, when compared to first electrode 801 and the second parallel electrode 812 may be considered as a third electrode. The second electrode 811 and the third electrode 812 are used exclusively for detecting resistance changes.

In an embodiment, a third intermediate electrode 817 is provided and a layer of an insulating material (dielectric) 818 is located between the first electrode 801 and the third electrode 817. When detecting position, capacitance is measured between the first electrode 801 and the third intermediate electrode 817.

A material for which resistance reduces in response to applied pressure is located below the third intermediate electrode 817, so as to be adjacent to the second electrodes, configured from the first parallel electrode 811 and the second parallel electrode 812. In addition, an air gap 820 is present below the material. Thus, when force is applied, the air gap 820 collapses, resulting in the material 819 been brought into physical contact with the second electrode (parallel electrodes 811 and 812.

In an embodiment, the first parallel electrode 811 is energized as a source, with the second parallel electrode 812 supplying a detection signal to the processing device 411. As pressure is applied, the resistance of material 819 will reduce and the amount of current flow will therefore increase. Similarly, the third parallel electrode 813 may be a source, the fourth parallel electrode 814 may be a detector and the fifth parallel electrode 815 may be a source.

The detectors described with reference to FIG. 6, FIG. 7 or FIG. 8 each facilitate the deployment of a method of detecting the position of manually applied pressure, in which a first scanning operation is performed to detect a change in resistance and a second scanning operation is performed to detect a change in capacitance. As described with reference to FIG. 5, these scanning operations may be performed periodically to detect applied pressure and movement. As movement occurs, the first scanning operation produces first position data based on resistance and the second scanning operation produces second position data based on capacitance.

Output position data is then derived from the combination of the first position data and the second position data. Specifically, in an embodiment, and is described with reference to FIG. 5, a position is initially identified by resistance measurement and this position is then confirmed by the capacitive measurement. Thus, first position data may be inhibited if not confirmed by the second position data.

The method also facilitates the deployment of a plurality of individual detectors, as described with reference to FIG. 4, which may be located along an edge of a mobile device, as described with reference to FIG. 3. As described with reference to FIG. 1 and FIG. 2, a deployment of pressure may provide an indication to change a parameter within an application running on the mobile device and subsequent movement may affect a change in this parameter.

In an alternative embodiment, electrodes for detecting capacitance may be separated from the force sensor. For example, in a mobile phone, position data may be available from a touch screen and pressure sensors may be located under the screen.

Evaluations of capacitance may be achieved using mutual capacitance techniques as an alternative to measuring self-capacitance.

The third embodiment builds on the construction of the first embodiment. A fourth embodiment is possible by building on the second embodiment in a similar way.

The invention claimed is:

1. A detector for detecting manually applied pressure, comprising:
    a substrate defining a position of activation;
    a plurality of electrodes mounted on said substrate; and
    a processing device for energizing said electrodes;
    said electrodes comprise a first electrode located on an upper surface for detecting a change in capacitance; and
    a second electrode and a third electrode for detecting a change in resistance; wherein
        said electrodes are configured to identify a position of applied pressure by detecting said change in resistance in response to a first energizing signal received from said processing device;
        said electrodes are configured to confirm said position of applied pressure by detecting said change in capacitance in response to a second energizing signal received from said processing device; and
        said processing device is configured to derive output position data from a combination of said position of applied pressure identified by detecting said change in resistance and said position of applied pressure confirmed by detecting said change in capacitance, said output position data is inhibited when said position of applied pressure by detecting said change in capacitance is not confirmed.

2. The detector of claim 1, wherein said electrodes are electrically isolated from said substrate.

3. The detector of claim 1, wherein said substrate is located within a mobile communication device.

4. The detector of claim 1, comprising a material for which resistance reduces in response to applied pressure located adjacent to said second electrode and said third electrode.

5. The detector of claim 4, comprising an air gap between said material and said third electrode, such that said material is brought into contact with said third electrode when pressure is applied.

6. The detector of claim 5, wherein said electrodes for resistive measurement are defined by a plurality of parallel electrodes.

7. The detector of claim 6, wherein a first plurality of said parallel electrodes are energized as source electrodes and a second plurality of said parallel electrodes are monitored as detector electrodes.

8. The detector of claim 7, wherein said source electrodes and said detector electrodes are selected so as to alternate in position.

9. The detector of claim 1, comprising a solid insulating material below said first electrode.

10. An apparatus for detecting manual movement over an edge of a mobile device, comprising a plurality of detectors according to claim 1.

11. A method of detecting a position of manually applied pressure, comprising the steps of:
    performing a first scanning operation with respect to a second electrode and a third electrode of a plurality of electrodes to detect a change in resistance; and
    performing a second scanning operation with respect to a first electrode of said electrodes to detect a change in capacitance; wherein
        said first scanning operation produces first position data based on resistance;
        said second scanning operation produces second position data based on capacitance;
        output position data is derived from a combination of said first position data and said second position data; and
        said output position data is based on said first position data and said output position data is inhibited when said second position data is not present.

12. The method of claim 11, further comprising the step of periodically performing said first scanning operation followed by said second scanning operation.

13. The method of claim 11, wherein a plurality of individual detectors is located along an edge of a mobile device;
    an application of pressure indicates an intention to change a parameter within an application running on said mobile device; and
    subsequent movement effects said change in said parameter.

* * * * *